(12) United States Patent
He et al.

(10) Patent No.: US 8,382,002 B2
(45) Date of Patent: Feb. 26, 2013

(54) MOIRÉ PATTERN GENERATED BY ANGULAR ILLUMINATION OF SURFACES

(75) Inventors: Bo He, Schaumburg, IL (US); Bjoern Rosner, Chicago, IL (US)

(73) Assignee: Nanoink, Inc., Skokie, IL (US)

( * ) Notice: Subject to any disclaimer, the term of this patent is extended or adjusted under 35 U.S.C. 154(b) by 17 days.

(21) Appl. No.: 13/013,741

(22) Filed: Jan. 25, 2011

(65) Prior Publication Data

US 2011/0182467 A1    Jul. 28, 2011

Related U.S. Application Data

(60) Provisional application No. 61/298,457, filed on Jan. 26, 2010.

(51) Int. Cl.
*G06K 19/05* (2006.01)
(52) U.S. Cl. .......................... 235/494; 235/380
(58) Field of Classification Search .................. 235/494, 235/487, 454, 375, 380
See application file for complete search history.

(56) References Cited

U.S. PATENT DOCUMENTS

| | | | | |
|---|---|---|---|---|
| 4,210,346 | A | * | 7/1980 | Mowry et al. .................... 283/94 |
| 4,884,828 | A | | 12/1989 | Burnham |
| 5,003,600 | A | * | 3/1991 | Deason et al. ................... 380/54 |
| 6,390,377 | B1 | * | 5/2002 | Dlugos ........................... 235/494 |
| 6,996,717 | B2 | | 2/2006 | Yin et al. |
| 7,081,282 | B2 | | 7/2006 | Kuntz et al. |
| 7,158,652 | B2 | | 1/2007 | Iwamura |
| 7,194,105 | B2 | | 3/2007 | Hersch et al. |
| 7,265,904 | B2 | | 9/2007 | Schilling et al. |
| 7,295,717 | B2 | | 11/2007 | Hersch et al. |
| 7,333,268 | B2 | | 2/2008 | Steenblik et al. |
| 7,367,593 | B2 | * | 5/2008 | Wicker .......................... 283/113 |
| 7,429,062 | B2 | | 9/2008 | Fan et al. |
| 7,845,572 | B2 | * | 12/2010 | Wicker et al. ................. 235/494 |
| 7,982,917 | B2 | * | 7/2011 | Wicker .......................... 358/3.28 |
| 2002/0054680 | A1 | | 5/2002 | Huang et al. |
| 2004/0076310 | A1 | | 4/2004 | Hersch et al. |
| 2007/0075150 | A1 | | 4/2007 | Luthi et al. |
| 2009/0008923 | A1 | | 1/2009 | Kaule et al. |
| 2010/0294146 | A1 | | 11/2010 | Fragala et al. |

(Continued)

FOREIGN PATENT DOCUMENTS

| EP | 0 967 091 A1 | 12/1999 |
|---|---|---|
| WO | WO 2006/047695 A2 | 5/2006 |

(Continued)

OTHER PUBLICATIONS

Search Report in International Application No. PCT/US2011/022442 mailed Sep. 26, 2011.

(Continued)

*Primary Examiner* — Daniel St. Cyr
(74) *Attorney, Agent, or Firm* — Foley & Lardner LLP

(57) ABSTRACT

Improved methods, devices, compositions, and systems are provided for concealing information on articles in commerce, such as pharmaceuticals, to improve detection of counterfeits. Embodiments are provided where Moiré patterns on article surfaces are detectable using a revealing layer only when the surfaces are illuminated at or near particular angles. Embodiments incorporating revealing layers into detection systems, such as microscopes, are also provided. A method comprising: providing at least one pharmaceutical composition which comprises at least one surface which comprises at least one area which is adapted to provide a Moiré base layer; illuminating the area at an angle; imaging the illuminated area with a Moiré revealing layer to generate a Moiré pattern. Such embodiments provide an additional layer of security over previous methods of detecting counterfeit articles.

47 Claims, 14 Drawing Sheets

U.S. PATENT DOCUMENTS

| | | | |
|---|---|---|---|
| 2010/0294147 A1 | 11/2010 | Loiret-Bernal et al. | |
| 2010/0294844 A1 | 11/2010 | Loiret-Bernal et al. | |
| 2010/0294927 A1 | 11/2010 | Nelson et al. | |
| 2010/0297027 A1 | 11/2010 | Loiret-Bernal et al. | |

FOREIGN PATENT DOCUMENTS

| | | | |
|---|---|---|---|
| WO | WO-2008/104025 A1 | 9/2008 | |
| WO | WO 2009/051794 A1 | 4/2009 | |

OTHER PUBLICATIONS

U.S. Appl. No. 61/227,012, filed Jul. 20, 2009, Disawal et al.

Hopkins, D. et al., "Counterfeiting exposed: protecting your brand and your customers," Wiley (2003).

Wertheimer, A. et al., "Counterfeit Pharmaceuticals: Current Status and Future Projections," 43 *J. Am. Pharm. Assoc.* 710 (2003).

\* cited by examiner

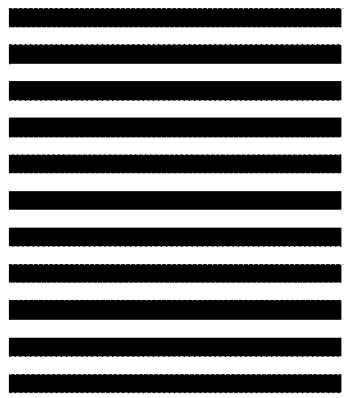 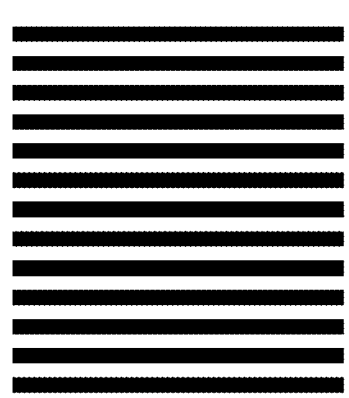 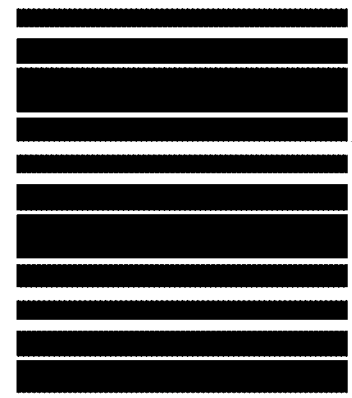
FIGURE 3A        FIGURE 3B        FIGURE 3C
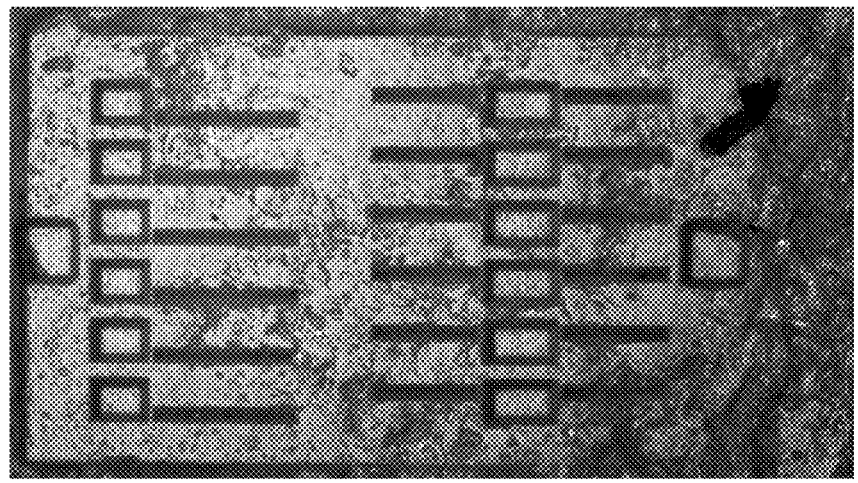
FIGURE 4

MOIRÉ PATTERN GENERATED BY ANGULAR ILLUMINATION OF SURFACES

RELATED APPLICATIONS

This application claims priority to U.S. provisional application Ser. No. 61/298,457 filed Jan. 26, 2010, which is hereby incorporated by reference in its entirety.

BACKGROUND

A need exists to provide for better protection and security against counterfeiting and grey-market trading, particularly for pharmaceuticals. A review of counterfeiting in pharmaceuticals and its economic effects may be found in, for example, (1) "Counterfeit Pharmaceuticals: Current Status and Future Projections," A. I. Wertheimer, N. M. Chaney, T. Santella, *J. Am. Pharm. Assoc.* 43(6) 710-718 (2003), and (2) Chapter 4 of the book *Counterfeiting exposed: protecting your brand and your customers*, D. M. Hopkins, L. T. Kontnik, M. T. Turnage (Wiley, Ed. 2003); ISBN: 0471269905. Chapter 12 describes current anti-counterfeiting methods, such as holograms, intaglio printing, color-shifting technologies, and chemical or biochemical taggants.

As counterfeiters become more sophisticated, however, improved means of providing and verifying covert identification on pharmaceuticals and other articles will allow improved detection of counterfeits.

SUMMARY

Embodiments provided herein include devices, systems, articles, and kits, and methods of making and using same.

For example, one embodiment provides a method comprising: providing at least one pharmaceutical composition which comprises at least one surface which comprises at least one area which is adapted to provide a Moiré base layer; illuminating the area at an angle; imaging the illuminated area with a Moiré revealing layer to generate a Moiré pattern. In one embodiment, the Moiré revealing layer does not contact the base layer. In one embodiment, the imaging is carried out with use of a microscope. In one embodiment, the area comprises embossed regions. In one embodiment, the area comprises nanoscale embossed regions. In one embodiment, the area comprises microscale embossed regions. In one embodiment, the area comprises microscale and nanoscale embossed regions. In one embodiment, the area comprises periodic patterns. In one embodiment, the illuminating step is carried out at a pre-determined angle and a pre-determined direction. In one embodiment, the revealing layer is positioned at an intermediate image plane in an optical path of a microscope. In one embodiment, an alignment mark is used to generate the Moiré pattern. In one embodiment, the Moiré pattern is a line Moiré pattern. In one embodiment, the Moiré pattern is a shape Moiré pattern.

Another embodiment provides a method comprising providing a surface, a revealing layer, and a light source; adjusting at least one of the surface or light source so that the light impinges on the surface at an angle that is near to a predetermined angle; aligning the revealing layer with respect to the surface; and recovering concealed information by viewing the surface through the revealing layer, wherein the concealed information may be recovered only when the light impinges the surface at an illumination angle near to the predetermined angle. The surface may comprise one or more indentations Such indentations may have been formed by such methods as embossing or molding. The surface may comprise one or more indentations whose cross-section may be triangular or trapezoidal. The concealed information may comprise one or more Moiré patterns, including, for example, line Moiré patterns or shape Moiré patterns. The concealed information may comprises dots or lines or circles or ellipses or polygons or letters or numbers or barcodes. The concealed information may comprise lot numbers, product identifiers, manufacturing dates, and the like. In some cases, the concealed information may be recovered with the use of a microscope, where the revealing layer may optionally be built into the microscope, for example, in an eyepiece. Or a kit might be provided comprising a microscope and a separate revealing layer, to be used to recover concealed information. The surface may be part of a pharmaceutical composition, such as a capsule or capsule or the like. The method may also comprise validation of the authenticity of such a pharmaceutical composition using the concealed information.

A second embodiment comprises a pharmaceutical composition comprising a surface, where the surface comprises at least one first macroscopic indentation, which in turn comprise one or more second microscopic or nano-scale indentations, which comprise concealed information. In some cases, the first indentation is from about 20 to about 100 microns deep. The second indentation may typically be from about 2 to about 6 microns deep or from about 90 to about 250 nm deep. The second indentation may have triangular or trapezoidal cross-section. The second indentation may comprise at least one shadow, where the surface comprises a base layer when the surface is illuminated at an illumination angle near to a predetermined angle. In such a case, the base layer may comprise the concealed information. The pharmaceutical composition may comprise a tablet or capsule or the like.

A third embodiment provides a composition comprising a surface, where one or more Moiré patterns may be perceived when observing the surface through a revealing layer when a light source impinges on the surface at a first angle, but where the patterns may not be perceived when the light source impinges on the surface at a second angle, where the two angles are not substantially equal. The composition may comprise a pharmaceutical tablet or capsule. The one or more Moiré patterns may comprise such symbols as dots, lines, circles, ellipses, polygons, letters, numbers, and the like. The surface may comprise indentations with trapezoidal or triangular cross-sections. Such indentations may comprise walls making an angle with the surface. In some embodiments, that angle is between about 50 and about 60 degrees. Either or both of the surface or the revealing layer may comprise concealed information. The surface may scatter or reflect light.

Another embodiment provides a device comprising a revealing layer, where one or more Moiré patterns may be perceived when observing a surface through the revealing layer when a light source impinges on the surface at a first angle, but where the patterns may not be perceived when the light source impinges on the surface at a second angle, where the two angles are not substantially equal. The device may also comprise a light source. A light source may comprise, for example, at least one incandescent light bulb, fluorescent light bulb, light emitting diode, laser, or the like. The device may be a microscope, where the revealing layer is placed in an intermediate image plane in the optical path of the microscope. In some cases, the revealing layer may be positioned inside an eyepiece of a microscope. In some cases, the revealing layer may be rotated. Either or both of the surface or the revealing layer may comprise concealed information.

Yet another embodiment provides a system comprising a surface and a revealing layer, where one or more Moiré patterns may be perceived when observing the surface through the revealing layer when a light source impinges on the surface at a first angle, but where the patterns may not be perceived when the light source impinges on the surface at a second angle, where the two angles are not substantially equal. The surface may comprise indentations with trapezoidal or triangular cross-sections. Such indentations may comprise walls making an angle with the surface; they may also comprise floors. In some embodiments, that angle is between about 50 and about 60 degrees. In some embodiments, the widths of lines perceived by an observer looking at the surface through the revealing layer may be determined by the angle of impingement of the light source on the surface, the angle between the walls and the surface, and the widths of the indentations at the surface and, in some cases, the widths of the floors. Either or both of the surface or the revealing layer may comprise concealed information. The light source may comprise, for example, at least one incandescent light bulb, fluorescent light bulb, light emitting diode, laser, or the like.

Still another embodiment provides a method comprising: providing a surface, a revealing layer, and a light source, where one or more Moiré patterns may be perceived when observing the surface through the revealing layer when the light source impinges on the surface at a first angle, but where the patterns may not be perceived when the light source impinges on the surface at a second angle, where the two angles are not substantially equal; adjusting the light source so that light from the light source impinges on the surface at or near the first angle; and observing the surface through the revealing layer, thereby perceiving one or more Moiré patterns. Either or both of the surface or the revealing layer may comprise concealed information. The light source may comprise, for example, at least one incandescent light bulb, fluorescent light bulb, light emitting diode, laser, or the like.

Another embodiment provides a composition comprising: a surface; and at least one indentation formed on the surface, wherein the surface is configured to reveal a predetermined pattern when a revealing layer is aligned over the surface and light impinges on the surface at an angle near to a predetermined angle, wherein the surface is configured not to reveal the predetermined pattern when light impinges on the surface at an angle not near to the predetermined angle, whether or not a revealing layer is aligned over the surface, and wherein the surface is configured not to reveal the predetermined pattern when a revealing layer is not aligned over the surface, whether or not light impinges on the surface at an angle near to the predetermined angle.

Another embodiment provides a method comprising: providing a surface; choosing a first pattern, wherein the first pattern is a pattern to be revealed; choosing a second pattern, wherein the second pattern is a pattern to be located in a revealing layer; choosing an angle at which light will impinge on the surface to reveal the first pattern; and forming at least one indentation on the surface, wherein the at least one indentation is configured such that, when the second pattern is aligned over the surface and light impinges on the surface at an angle near to the chosen angle, the first pattern is revealed to an observer viewing the surface through the revealing layer, wherein the at least one indentation is configured such that, when the second pattern is not aligned over the surface, the first pattern is not revealed, and wherein the at least one indentation is configured such that, when light does not impinge on the surface at an angle near to the chosen angle, the first pattern is not revealed.

At least one advantage for at least one embodiment is added protection against counterfeiting. For example, information can be hidden which becomes apparent through the revealing layer. Also, a high level of dimensional accuracy may be needed for good Moiré features, which may be higher than for standard covert features. This can increase the security value because it is more difficult to counterfeit.

BRIEF DESCRIPTION OF FIGURES

FIG. 3A depicts a base layer of a line Moiré pattern formed by grating lines.

FIG. 3B depicts a revealing layer of a line Moiré pattern formed by grating lines.

FIG. 3C depicts the line Moiré pattern observed by viewing the base layer of FIG. 3A through the revealing layer of FIG. 3B.

FIG. 4 is an optical microscope image of a base layer of a shape Moiré pattern on a pharmaceutical tablet illuminated from a direction normal to the base layer.

DETAILED DESCRIPTION

Figure 1:
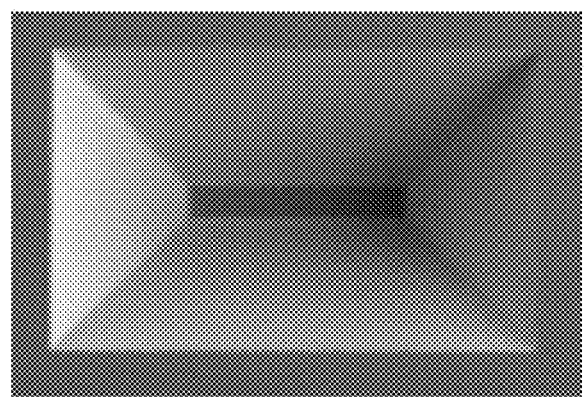
FIG. 1 depicts an overhead view of an indentation in a surface.

All cited references in this application are incorporated by reference in their entirety. Citation of references is not an admission that any is prior art.

Moiré Patterns

A Moiré pattern is a visual effect perceived by an observer resulting from the interference between two or more sets of similar images that differ slightly in size, spacing, and/or angular orientation. The images might comprise lines, curves, symbols, circles, ellipses, dots, letters, numbers, and the like. In some cases, the images may comprise barcodes. The images may be formed by such methods as printing, etching, embossing, and other methods known in the art. In some cases the two or more sets of similar images may lie in or on a single surface. In other cases, one or more images may lie in or on one or more transparent or semi-transparent layers placed between an observer and a surface that may also contain one or more images.

One type of Moiré pattern is the line Moiré pattern, which is made up of two or more gratings that, when superimposed, generate the Moiré pattern. The gratings may comprise parallel lines or curves, or may comprise concentric circles, ellipses, polygons, or other shapes. In other cases, the lines or curves may be oriented radially with respect to one or more locations. These and other variations are known in the art.

Another type of Moiré pattern is the shape Moiré pattern, which is capable of generating symbols, letters, numbers, and other shapes from two or more superimposed images. The images may comprise lines, dots, curves, and the like that need not themselves individually resemble the generated Moiré pattern.

Examples of Moiré patterns and related technologies are provided in the following patent publications and patents, each of which is incorporated by reference in its entirety: international patent publication WO 2009/051794, "Pharmaceutical Moiré Pill," published Apr. 23, 2009; US patent publication 2009/0008923, "Security Element," published Jan. 8, 2009; U.S. Pat. No. 7,429,062, "Anti-Counterfeiting See-Through Moiré Security Feature Using Frequency-Varying Patterns," issued Sep. 30, 2008; U.S. Pat. No. 7,333,268, "Micro-Optic Security and Image Presentation System," issued Feb. 19, 2008; U.S. Pat. No. 7,295,717, "Synthesis of Superposition Images for Watches, Valuable Articles and Publicity," issued Nov. 13, 2007; U.S. Pat. No. 7,194,105, "Authentication of Documents and Articles by Moiré Patterns," issued Mar. 20, 2007; U.S. Pat. No. 7,158,652, "Method of Using Plural Watermarks to Prevent Unauthorized Image Copying," issued Jan. 2, 2007; U.S. Pat. No. 7,081,282, "Optically Variable Marking," issued Jul. 25, 2006; international patent publication WO 2006/047695, "Dosage Forms Having a Microreliefed Surface and Methods and Apparatus for their Production." published May 4, 2006; US patent publication 2002/0054680, "Optical Watermark," published May 9, 2002; U.S. Pat. No. 7,367,593, "Security Documents and a Method and Apparatus for Printing and Authenticating such Documents," issued May 6, 2008; U.S. Pat. No. 7,265,904, "Optical Security Element," issued Sep. 4, 2007; U.S. Pat. No. 6,996,717, "Semi-Fragile Watermarking System for MPEG Video Authentication," issued Feb. 7, 2006; and U.S. Pat. No. 4,884,828, "Security Documents," issued Dec. 4, 1989.

Base Layers, Revealing Layers, Moiré Pairs, and Concealed Information

Of particular interest are Moiré patterns created when the two or more sets of images are partitioned between a base layer and a transparent or semi-transparent revealing layer so that at least one Moiré pattern may be perceived only when viewing the base layer through the revealing layer. Such a base layer and revealing layer make up a Moiré pair. In some cases, the base layer or the revealing layer may need to be rotated with respect to each other in order for the images on the two layers to be sufficiently aligned to perceive the Moiré patterns. FIG. 3 depicts gratings on a base layer and on a revealing layer, along with the line Moiré pattern that results when viewing the base layer through a superimposed revealing layer.

Such a configuration may be used to conceal information on or in the base layer, requiring use of the revealing layer in order to perceive the information concealed on or in the base layer. Alternatively, the information may be concealed on or in the revealing layer, requiring use of the base layer in order to perceive the information concealed on or in the revealing layer. In still other cases, concealed information may be present on both the surface and the revealing layer. Such concealed information may include covert features. Covert features are those that are typically difficult to detect, locate, or decode, especially with the naked eye or with conventional inspection technology, such as optical imaging. Examples of covert features are described in U.S. application Ser. Nos. 11/109,877 filed Apr. 20, 2005 (published as US Pat. Pub. 2010/0294844), and 11/305,326 filed Dec. 19, 2005 (published as US Pat. Pub. 2010/0294146), both of which are incorporated by reference in their entirety. Such covert features could enable detection of counterfeits without alerting counterfeiters of their presence. Alternatively, they might allow traceability of objects or compositions of commercial value, such as pharmaceutical items, by incorporating such information as pharmaceutical lot numbers, product identifiers, manufacture dates, and the like. Systems for detection of such covert features have been described in U.S. application Ser. No. 11/519,199 filed Sep. 12, 2006, (published as US Pat. Pub. 2010/0294927) which is incorporated by reference in its entirety.

In some embodiments, more than one set of information may be concealed on or in the base layer and revealing layer, with each set of information being perceivable at different rotational angles as the revealing layer is rotated with respect to the surface. In some cases, orthogonal angles may be used, where the revealing layer must be rotated in multiples of 90 degrees to reveal the various concealed sets of information. Where there is periodicity associated with the various patterns, the periods corresponding to each orthogonal direction need not be the same.

In some embodiments, confusion patterns may be introduced into either or both of the surface or revealing layers. Some portions of the confusion patterns may contribute to a Moiré pattern, while some portions or all of the confusion pattern may be blocked out by patterns on the other member of the Moiré pair. Confusion patterns can increase the difficulty for counterfeiters to discern concealed information.

Surfaces, Indentations, Walls, Floors

A surface may comprise indentations. In some embodiments, indentations may have triangular or trapezoidal cross section. An indentation may comprise walls extending from the surface to a floor. FIG. 1 shows an example of the top view of a surface comprising an indentation with trapezoidal cross section. In this example, the indentation comprises four walls and a floor.

Indentations may be introduced into surfaces by any known means, such as etching, stamping, embossing, molding, and the like. In some embodiments, indentations may be introduced by using stamps that have an inverse image of the indentations. Such stamps may be in turn be made from molds which themselves would comprise indentations.

Examples of such methods are provided in the following patent applications, each of which incorporated by reference in its entirety: U.S. provisional patent application Ser. No. 61/227,012, "Nano-Molding Micron and Nano Scale Features," filed Jul. 20, 2009 (see also PCT/US2010/042468); U.S. patent application Ser. No. 11/305,327, "Apparatus and Methods for Preparing Identification Features Including Pharmaceutical Features," filed Dec. 19, 2005 (published as US Pat. Pub. 2010/0294147); U.S. patent application Ser. No. 11/305,326, "Stamps with Micrometer and Nanometer-Scale Features and Methods of Fabrication Thereof," filed Dec. 19, 2005 (published as US Pat. Pub. 2010/0294146); U.S. patent application Ser. No. 11/305,189. "Overt Authentication Features for Compositions and Objects and Methods of Fabrication and Verification Thereof," filed Dec. 19, 2005 (published as US Pat. Pub. 2010/0297027); and U.S. patent application Ser. No. 11/109,877, "Identification Features," filed Apr. 20, 2005 (published as US Pat. Pub. 2010/0294844). See also, for example, US Pat. Pub. 2010/0297228.

Figure 2:
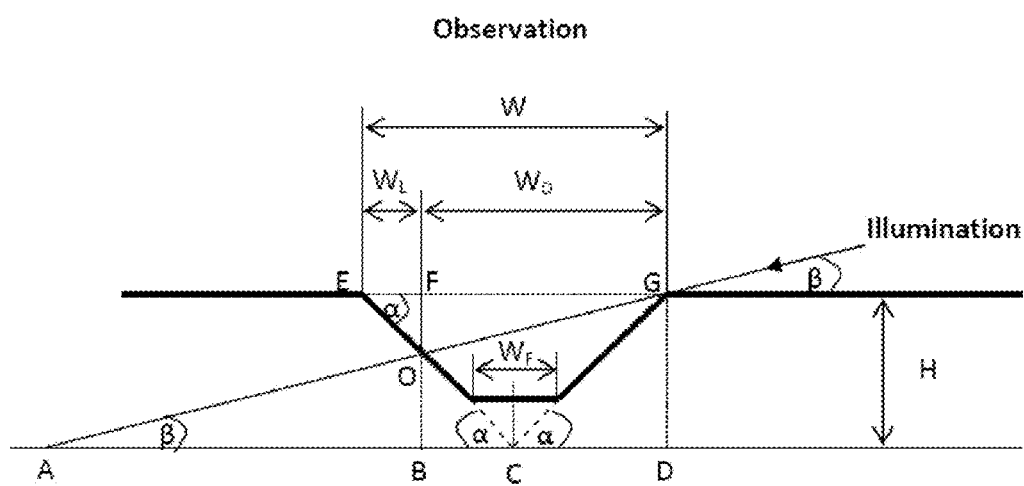
FIG. 2 is a schematic of a side view of an indentation in a surface.

For cases where indentations comprise one or more walls, the surface and walls will generally meet at an angle, denoted "α" in FIG. 2. When a mold or surface is made from a (100) silicon wafer and is anisotropically etched, this angle will be between about 50 and about 60 degrees, corresponding to the theoretical angle between the (100) and (111) crystallographic planes, which is equal to the arctangent of the square root of 2.

Light Sources, Illumination Angles, and Indentation Geometry

In some embodiments, the surface is illuminated by a light source. Light from the light source may impinge the surface at an illumination angle with respect to the surface, denoted "β" in FIG. 2. A light source may comprise, for example, at least one incandescent light bulb, fluorescent light bulb, light emitting diode, laser, or the like.

Where a surface comprises indentations, the angle of illumination from the light source can affect the size of shadows cast in the indentations. By choosing a specific angle of illumination and the size of the indentations, one can design the size of shadows in each indentation on the surface. As the angle of illumination varies from the specified angle, the sizes of the shadows will vary from their designed sizes. In some cases, the shapes of the shadows cast in the indentations may vary according to the direction from which the light illuminates the surface. It may therefore be necessary to rotate the surface or to change the direction of illumination to ensure proper alignment of the indentations to the direction of illumination.

An example is illustrated in FIG. 2. Angle "α" is the angle between the surface and the walls of the indentation. Angle "β" is the angle of impingement of illumination on the surface by the light from the light source. For an indentation of width "W", the sizes of the portions of the indentation that are illuminated and in shadow are "$W_L$" and "$W_D$", respectively.

The following equations may be used to determine the widths of the indentations needed to achieve desired shadow sizes "$W_D$" compatible with angles "α" and "β":

for the case of an indentation with triangular cross-section, where "α" is less than "β", $$W = \left(\frac{\sin(\alpha + \beta)}{\sin\alpha\sin\beta}\right)W_D;$$

for the case of an indentation with trapezoidal cross-section, where no portion of the floor of the indentation is illuminated, $$W = \left(\frac{\sin(\alpha + \beta)}{\sin\alpha\sin\beta}\right)W_D; \text{ and}$$

for the case of an indentation with trapezoidal cross-section, where a portion of the floor of the indentation is illuminated and where the floor has width "$W_F$" (as shown in FIG. 2), $$W = W_F + \frac{2W_D}{\tan\alpha\cot\beta}.$$

Concealing the Base Layer Image

One may design the indentations on or in a surface to conceal the base layer image by constructing the base layer image using the shadows in the indentations. Only when the angle of illumination is near the design angle "β" will the shadows be of the correct size so that the surface can act as a base layer. If the angle of illumination departs from the design angle, in some cases by ten degrees, in some cases by five degrees, in some cases by two degrees, the Moiré pattern will no longer be perceivable when looking at the surface through a revealing layer. Such a design can introduce an additional layer of security to further conceal information contained on the base layer, the revealing layer, or both.

Optical Microscopes, Eye-Pieces, Intermediate Image Planes

Figure 9:
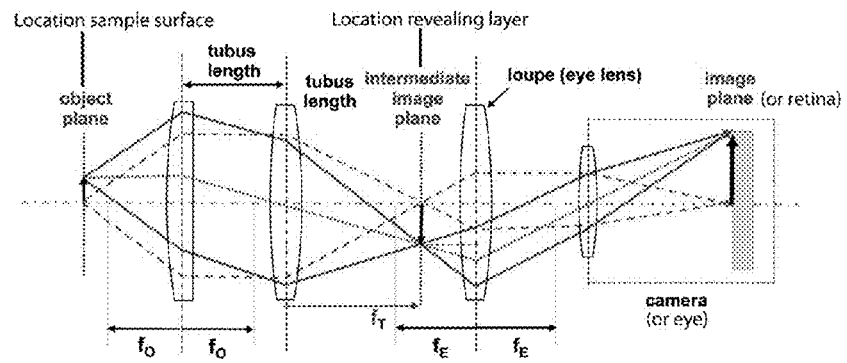
FIG. 9 depicts an optical beam path for a microscope, with one set of possible locations for the sample surface and revealing layer indicated.

In some embodiments, the revealing layer may be positioned in an intermediate image plane of an optical microscope. FIG. 9 depicts an example of such an embodiment. Such a microscope may be designed so that the revealing layer is positioned in an intermediate image plane within the eyepiece of the microscope, for example, where a measurement reticle may be located. In such a case, the sizes of the images in or on the revealing layer would be scaled so that an observer, when observing a base layer through the eyepiece, may observe a Moiré pattern. The eyepiece may be rotatable to aid alignment of the images on the base layer and revealing layer.

In other embodiments, the revealing layer may be positioned directly on top of the base layer, so both lie in or near the object plane of the microscope. In such a case, the method of illuminating the surface at a proper angle to provide a base layer may need to compensate for the presence of the intervening revealing layer. The image in or on a revealing layer positioned in or near the object plane will generally be smaller than such an image used at an intermediate image plane. For example, where the base layer comprises microscopic features, a revealing layer positioned in or near the object plane will also generally comprise microscopic features, while one positioned at an intermediate image plane could comprise much larger features.

In still other embodiments, an imaging system may be used to display images of the base layer on a screen or display. In this case, it is possible to scale a revealing layer so that one viewing the displayed image through the scaled revealing layer may observe a Moiré pattern. In some cases, the displayed image may comprise scan lines or pixels generated from the imaging system.

Pharmaceutical Compositions Comprising Surfaces

In some embodiments, the surface may be part of a pharmaceutical composition, such as a tablet or capsule. To provide homogeneity of the bright areas of Moiré patterns, such surfaces may be designed to strongly scatter light. For example, an uncoated tablet or a tablet with a coating containing inhomogeneous ingredients to increase light scattering might be used. Similarly, a capsule might be formed from a film containing inhomogeneous ingredients or coated with a coating that increases light scattering. Use of scattering surfaces generally increases the range of viewing angles for which the features on or in the surface may be perceived. Because use of highly scattering surfaces may decrease overall contrast, images on revealing layers may need to be rendered in shades of grey to create homogeneous Moiré patterns.

An alternative strategy would use highly reflective surfaces, thereby increasing overall contrast between light and dark areas. Selecting pharmaceutical tablet or capsule compositions and coatings to maximize contrast would allow use of dark images on revealing layers to provide homogeneous Moiré patterns. A potential drawback of this approach is that non-scattering surfaces generally require increasing the observation angle (or light collection angle, if the surface is being viewed using an imaging system) to allow the features on or in the surface to be perceived.

Figure 12:
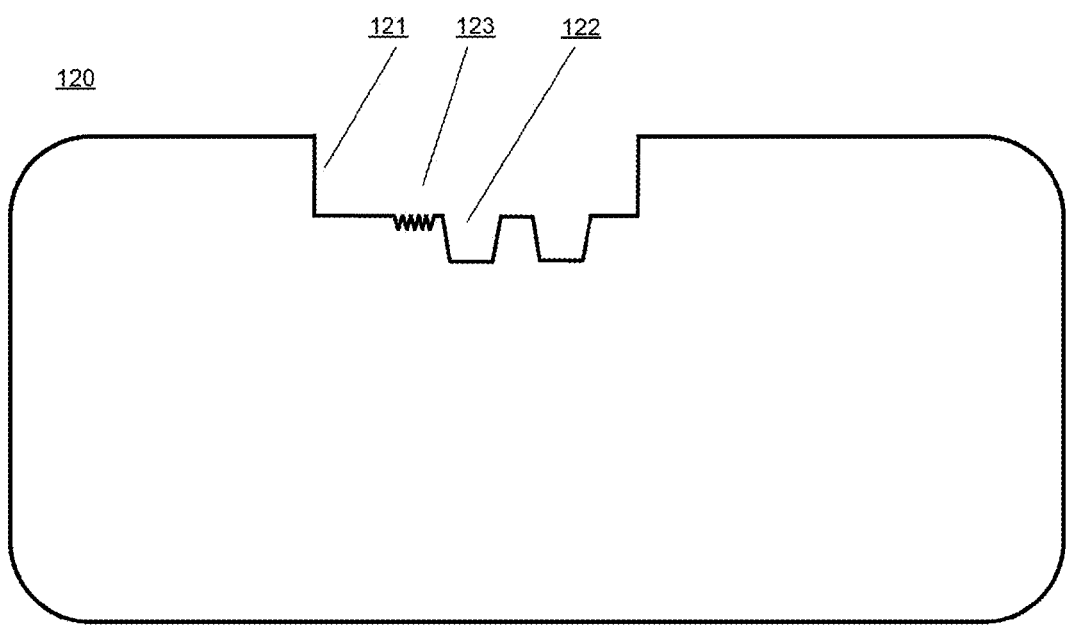
FIG. 12 depicts a pharmaceutical composition with macroscopic, microscopic, and nano-scale features.

FIG. 12 depicts an exemplary pharmaceutical composition 120, such as a tablet or a capsule or the like. The pharmaceutical composition 120 may have one or more macroscopic indentations 121, which may be visible to the naked eye. Macroscopic indentations may typically be 20-50 microns deep for tablets or 50-100 microns deep for capsules. Such macroscopic indentations can protect smaller scale features from damage by, for example, abrasion during shipping and handling. A base layer may comprise macroscopic indentations.

In the macroscopic indentations 121, there may be one or more microscopic indentations 122. Microscopic indentations typically can be, for example, about 2-6 microns deep, measured with respect to the floor of the macroscopic indentation 121. Such microscopic indentations may include features that may be observed using such tools as microscopes. A base layer may comprise microscopic indentations.

In the macroscopic indentations 121 or the microscopic indentations 122, there may be one or more nano-scale indentations 123. Such nano-scale indentations may typically be 90-250 nm deep, measured with respect to the floor of the macroscopic indentation 121 or microscopic indentation 122. Such nano-scale indentations may include features that may be observed using such tools as atomic force microscopes. A base layer may comprise nano-scale indentations.

EXAMPLES

Example 1

Shape Moiré

A stamp was provided that had an inverse image of the base layer of a shape Moiré pair. This stamp was used to emboss the surface of a pharmaceutical tablet. FIG. 4 is an optical image of the resulting base layer structure embossed on the tablet. A light source was aimed normal to the surface of the tablet. The microscope observation angle was also normal to the surface.

Figure 5A:
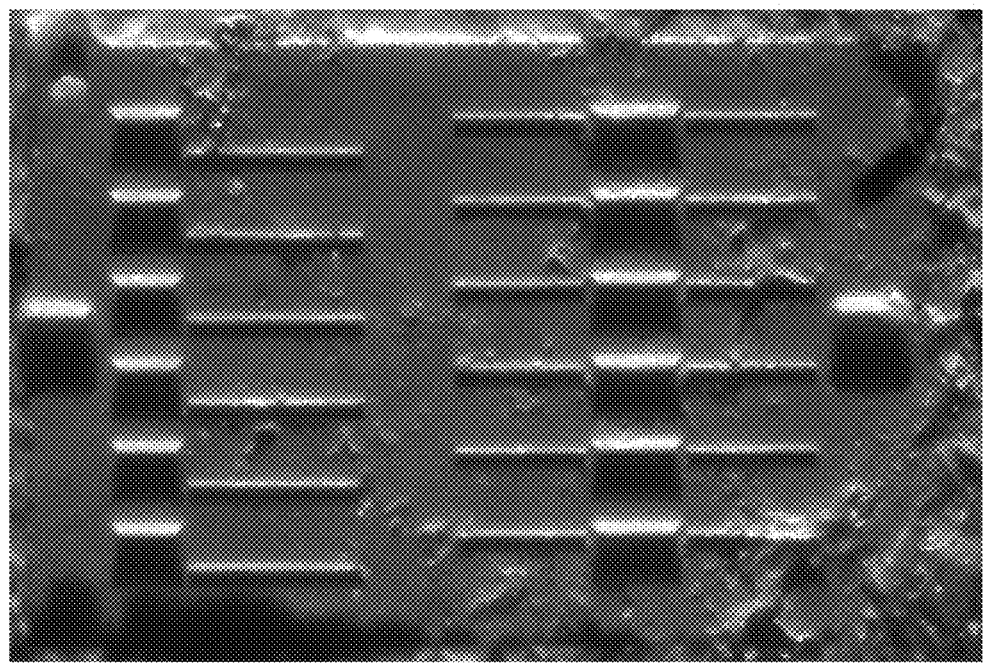
FIG. 5A is an optical microscope image of a base layer of a shape Moiré pattern illuminated at the angle specified by design.
Figure 5B:
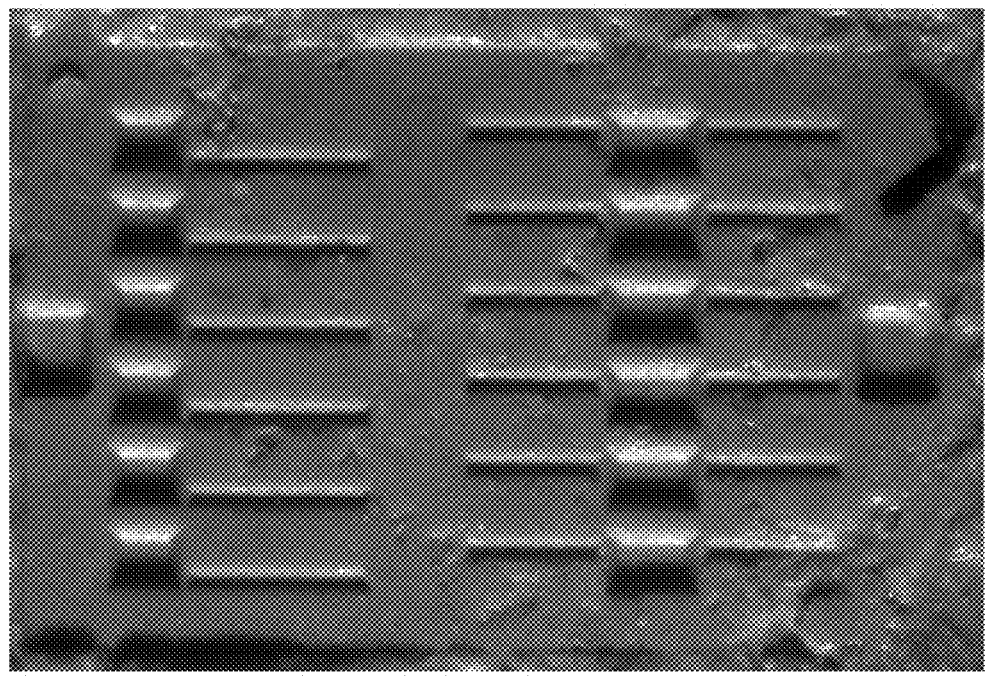
FIG. 5B is an optical microscope image of a base layer of a shape Moiré pattern illuminated at an angle different from that specified by design.

The angle of illumination was changed. FIG. 5A is an optical image where the illumination angle was the same as that specified by design. Note the dark areas (shadows) in this figure that are absent in FIG. 4. FIG. 5B is an optical image where the illumination angle is between that of FIG. 4 and FIG. 5A. The dark areas in this figure are smaller than those in FIG. 5A.

Figure 6A:
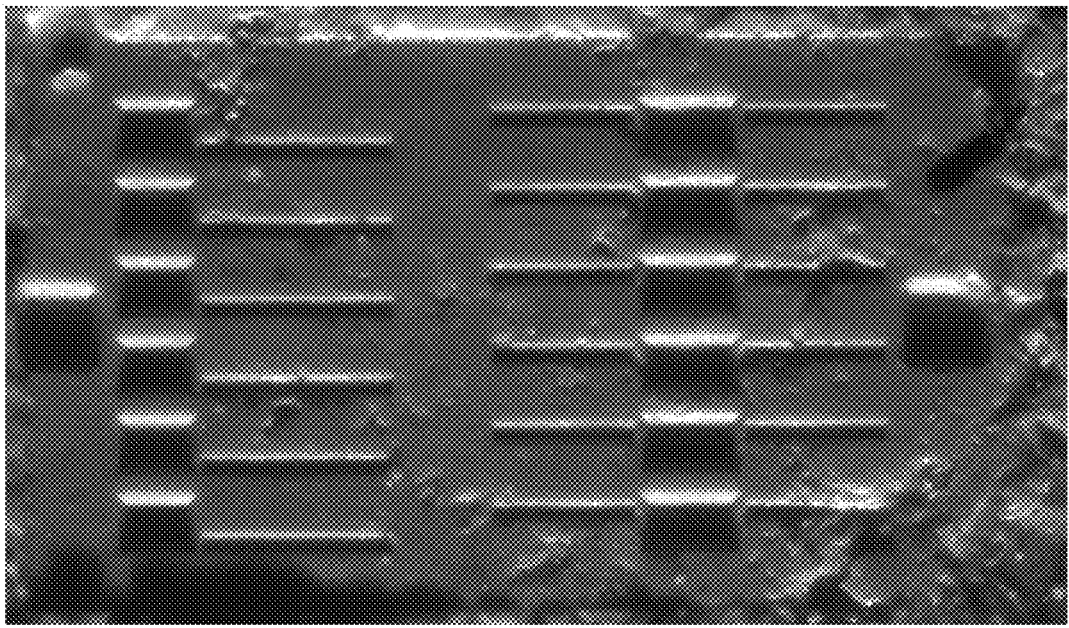
FIG. 6A is an optical microscope image of a base layer of a shape Moiré pattern illuminated at the angle specified by design.
Figure 6B:
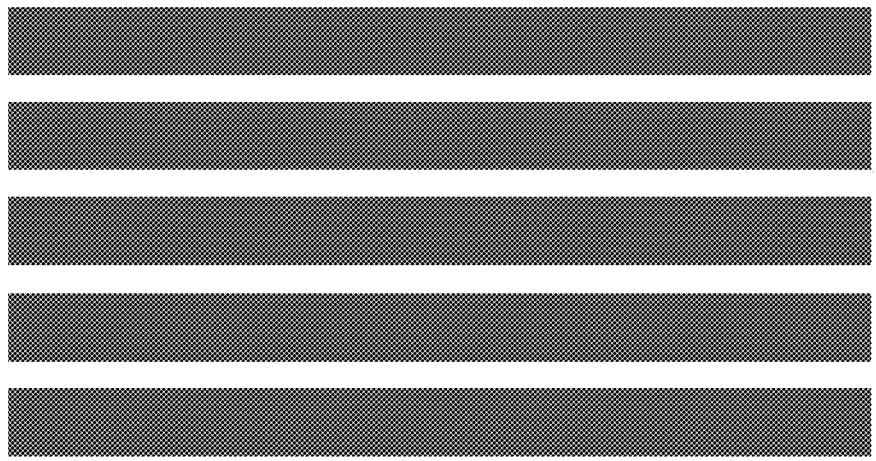
FIG. 6B depicts a revealing layer to be used with the base layer of FIG. 6A.
Figure 6C:
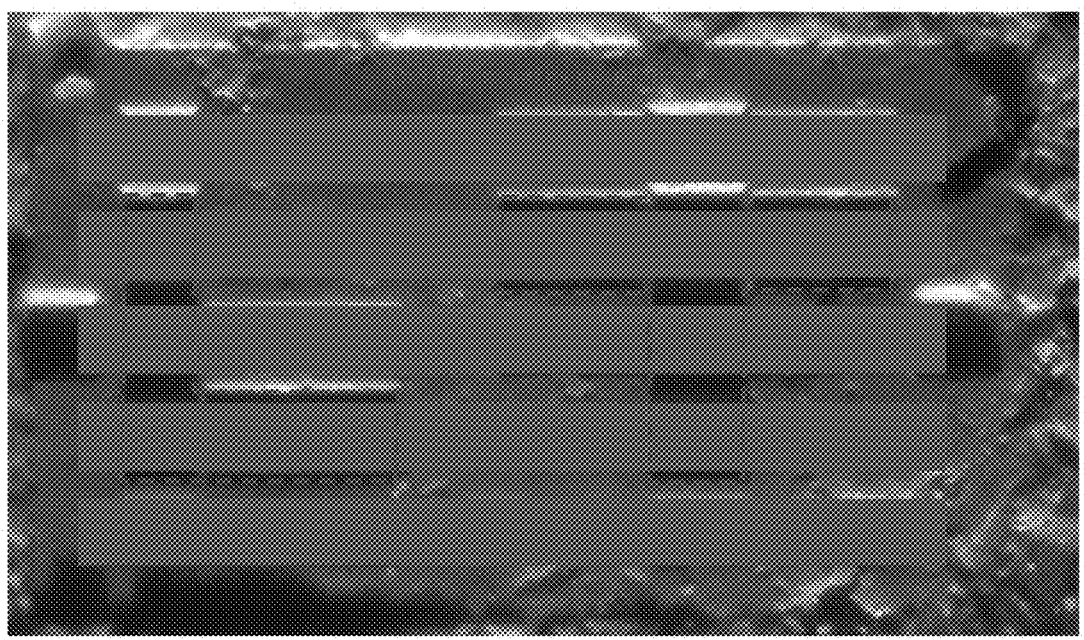
FIG. 6C depicts a Moiré pattern comprising a capital letter "L" and a capital letter "T" that might be observed by viewing the base layer of FIG. 6A through the revealing layer of FIG. 6B.

FIG. 6A is an optical image of another similarly prepared surface. FIG. 6B depicts a revealing layer that might be used. FIG. 6C depicts shape Moiré patterns that might be observed when the revealing layer of FIG. 6B is superimposed over the base layer of FIG. 6A, when the illumination angle is the same as that specified by design. In this depiction, the capital letters "L" and "T" might be observed when viewing the base layer through the revealing layer. (Note that in this figure, the image of the revealing layer is electronically generated and is not part of the optical microscope picture.)

Example 2

Line Moiré

Figure 7:
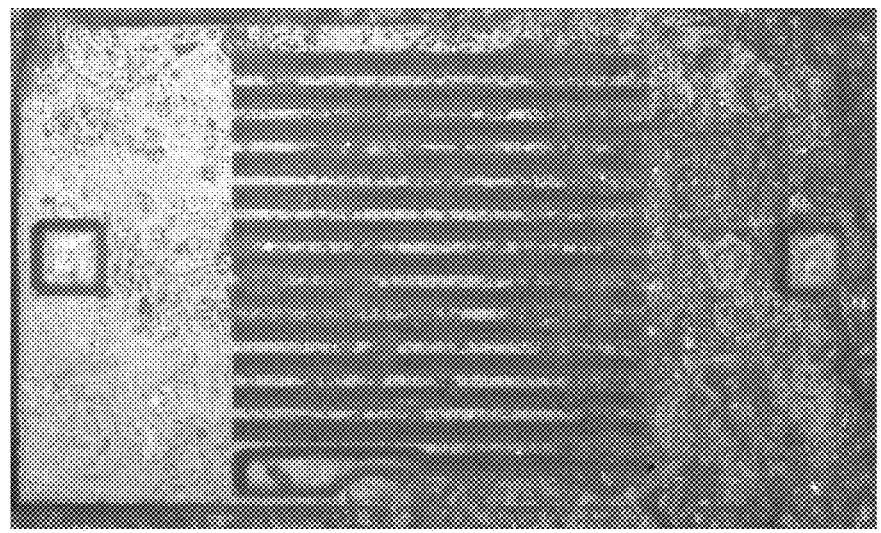
FIG. 7 is an optical microscope image of a base layer of a line Moiré pattern on a pharmaceutical tablet illuminated from a direction normal to the base layer.

A stamp was provided that had an inverse image of the base layer of a line Moiré pair. This stamp was used to emboss the surface of a pharmaceutical tablet. FIG. 7 is an optical image of the resulting base layer structure embossed on the tablet. A light source was aimed normal to the surface of the tablet. The microscope observation angle was also normal to the surface.

Figure 8A:
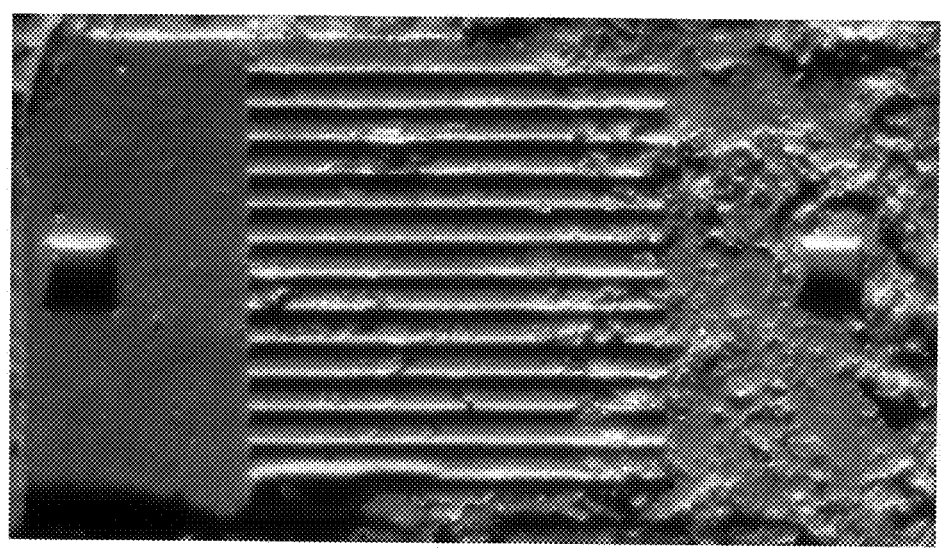
FIG. 8A is an optical microscope image of a base layer of a line Moiré pattern on a pharmaceutical tablet illuminated at the angle specified by design.
Figure 8B:
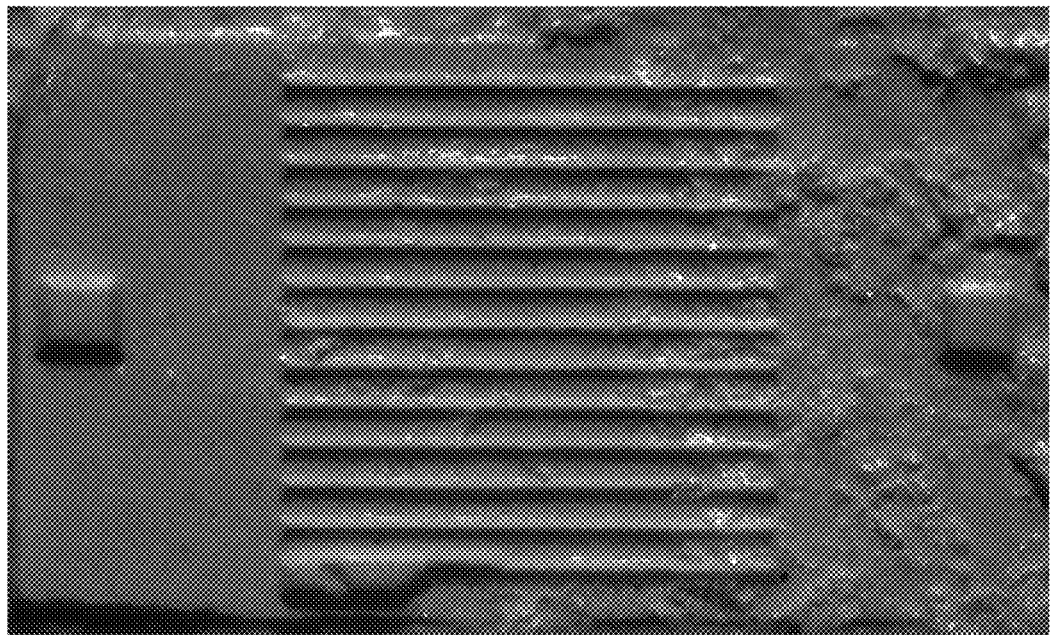
FIG. 8B is an optical microscope image of a base layer of a line Moiré pattern on a pharmaceutical tablet illuminated at an angle different from that specified by design.

The angle of illumination was changed. FIG. 8A is an optical image where the illumination angle was the same as that specified by design. Note the dark areas (shadows) in this figure that are absent in FIG. 7. FIG. 8B is an optical image where the illumination angle is between that of FIG. 7 and FIG. 8A. The dark areas in this figure are smaller than those in FIG. 8A.

Figure 8C:
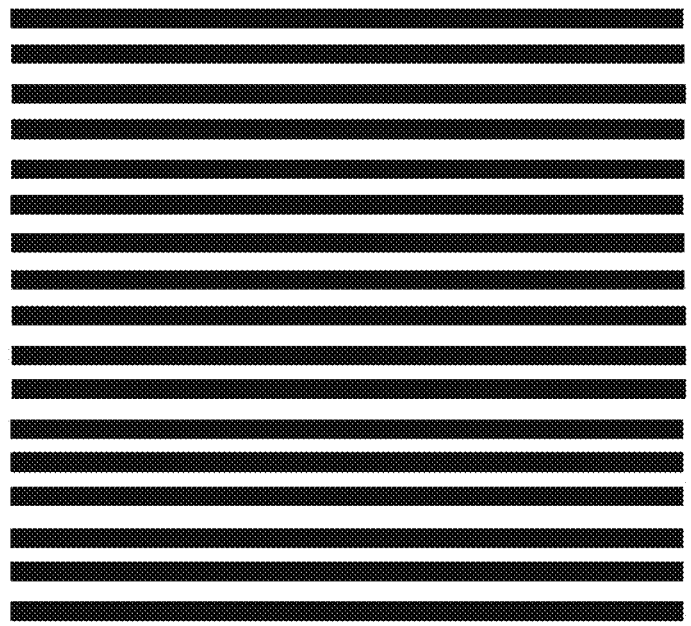
FIG. 8C depicts a revealing layer to be used with the base layer of FIG. 8B.
Figure 8D:
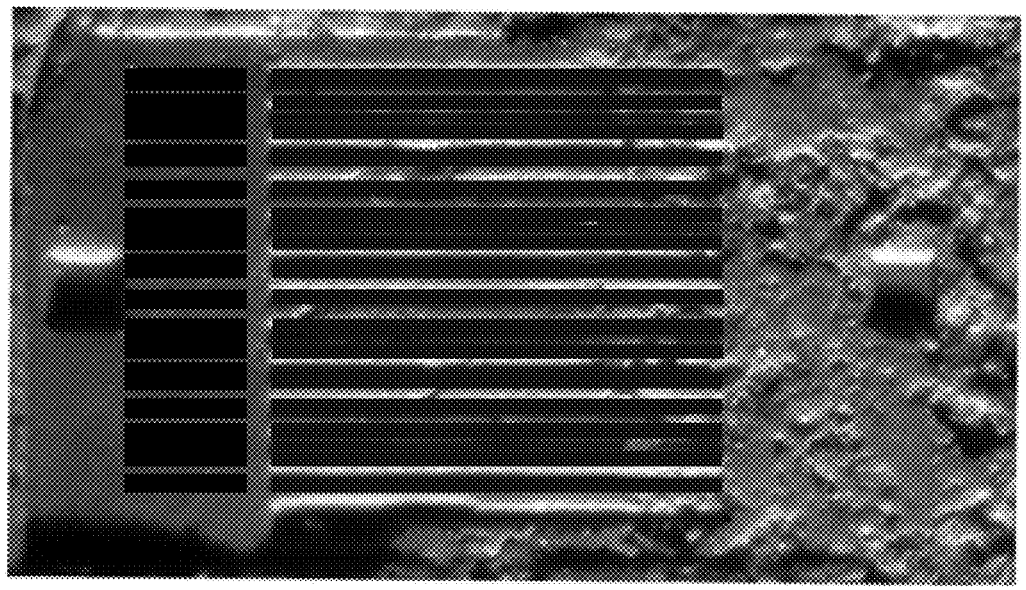
FIG. 8D depicts a Moiré pattern that might be observed by viewing the base layer of FIG. 8A through the revealing layer of FIG. 8C, when the surface is illuminated at the angle specified by design.

FIG. 8C depicts a revealing layer that may be used. FIG. 8D depicts line Moiré patterns that might be observed when a revealing layer is superimposed over the base layer, when the illumination angle is the same as that specified by design. Superimposed on this figure, to the left of the generated line Moiré pattern, is the line Moiré pattern as originally designed. (Note that in this figure, the image of the revealing layer is electronically generated and is not part of the optical microscope picture.)

Example 3

Effective Structures (Prophetic)

Figure 10A:
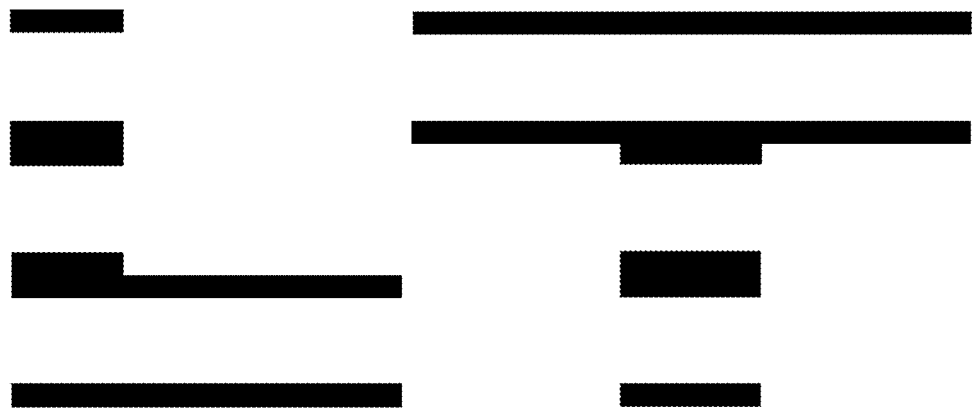
FIG. 10A depicts a base layer comprising effective structures.

A stamp is provided that has an inverse image of the base layer of a Moiré pair that comprises effective structures. The stamp is used to emboss the surface of a pharmaceutical tablet. FIG. 10A depicts the base layer comprising effective structures.

Figure 10B:
FIG. 10B depicts a Moiré pattern comprising a capital letter "L" and a capital letter "T" that might be observed by viewing the base layer of FIG. 10A with an appropriate revealing layer.

FIG. 10B depicts the Moiré pattern that is observed then the base layer of FIG. 10A is viewed through an appropriate revealing layer. Note that the letters "L" and "T" are made up of portions of the base layer and portions of the revealing layer.

Example 4

Confusion Patterns (Prophetic)

Figure 10C:
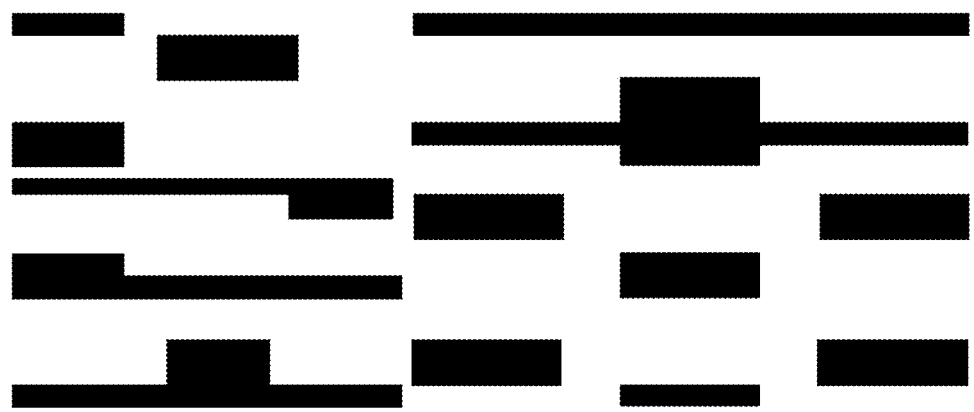
FIG. 10C depicts a base layer of FIG. 10A augmented with confusion patterns.

A stamp is provided that has an inverse image of the base layer of a Moiré pair that comprises both effective structures and confusion patterns. The stamp is used to emboss the surface of a pharmaceutical tablet. FIG. 10C depicts the base layer. Note that it is more difficult to discern the letters in this figure than in FIG. 10A, which does not contain confusion patterns.

Figure 10D:
FIG. 10D depicts a Moiré pattern that might be observed by viewing the base layer of FIG. 10C with an appropriate revealing layer.

FIG. 10D depicts the Moiré pattern that is observed then the base layer of FIG. 10C is viewed through an appropriate revealing layer. The confusion patterns are blocked out by the revealing layer, allowing the capital letters "L" and "T" to be discerned.

Example 5

Multiple Patterns Oriented in Orthogonal Directions (Prophetic)

Figure 11A:
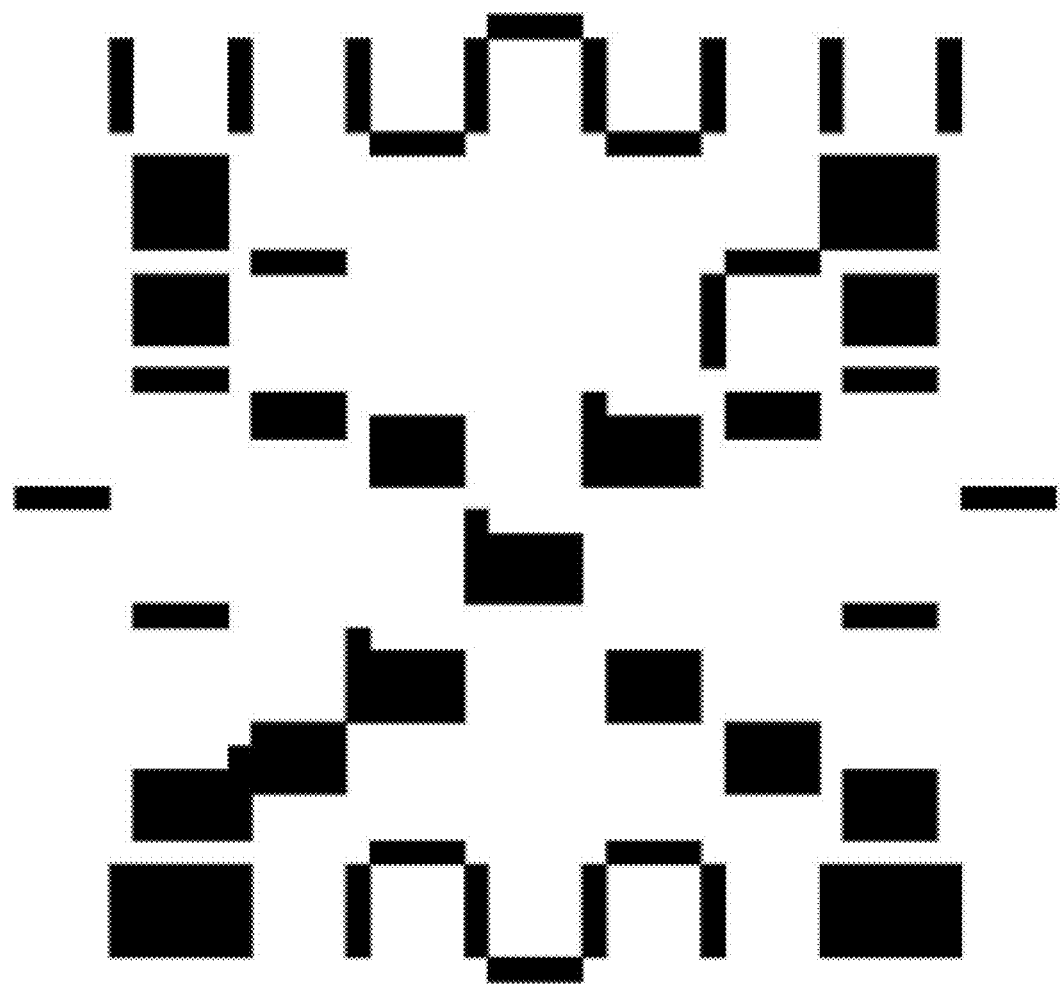
FIG. 11A depicts a base layer with two different structures concealed in orthogonal directions. This figure also contains confusion patterns to increase the complexity of the design.

A stamp is provided that has an inverse image of the base layer of a Moiré pair that comprises two patterns designed to be viewed from two orthogonal directions. The base layer also comprises confusion patterns. The stamp is used to emboss the surface of a pharmaceutical tablet. FIG. 11A depicts the base layer.

Figure 11B:
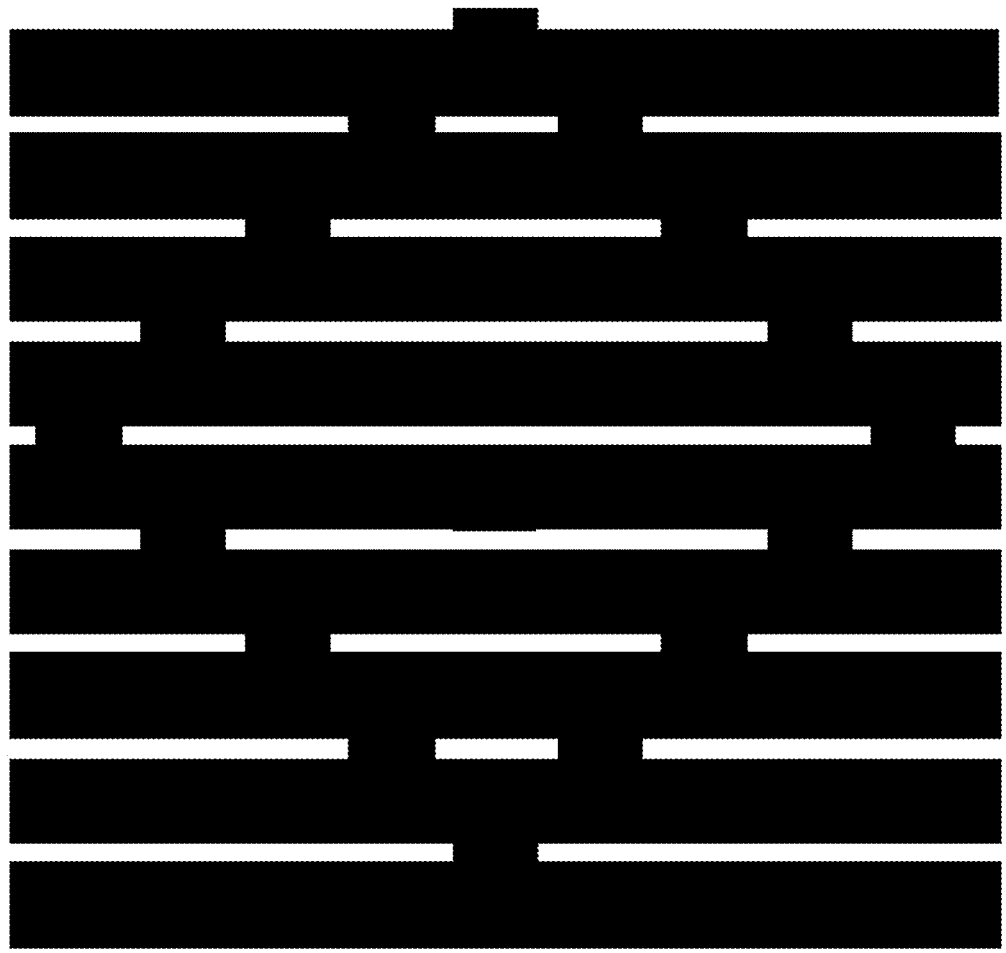
FIG. 11B depicts a Moiré pattern comprising a diamond when viewing the base layer of FIG. 11A through an appropriate revealing layer.

FIG. 11B depicts the Moiré pattern that is observed when viewing the base layer of FIG. 11A through a revealing layer oriented in a first direction. A diamond shape is discerned.

Figure 11C:
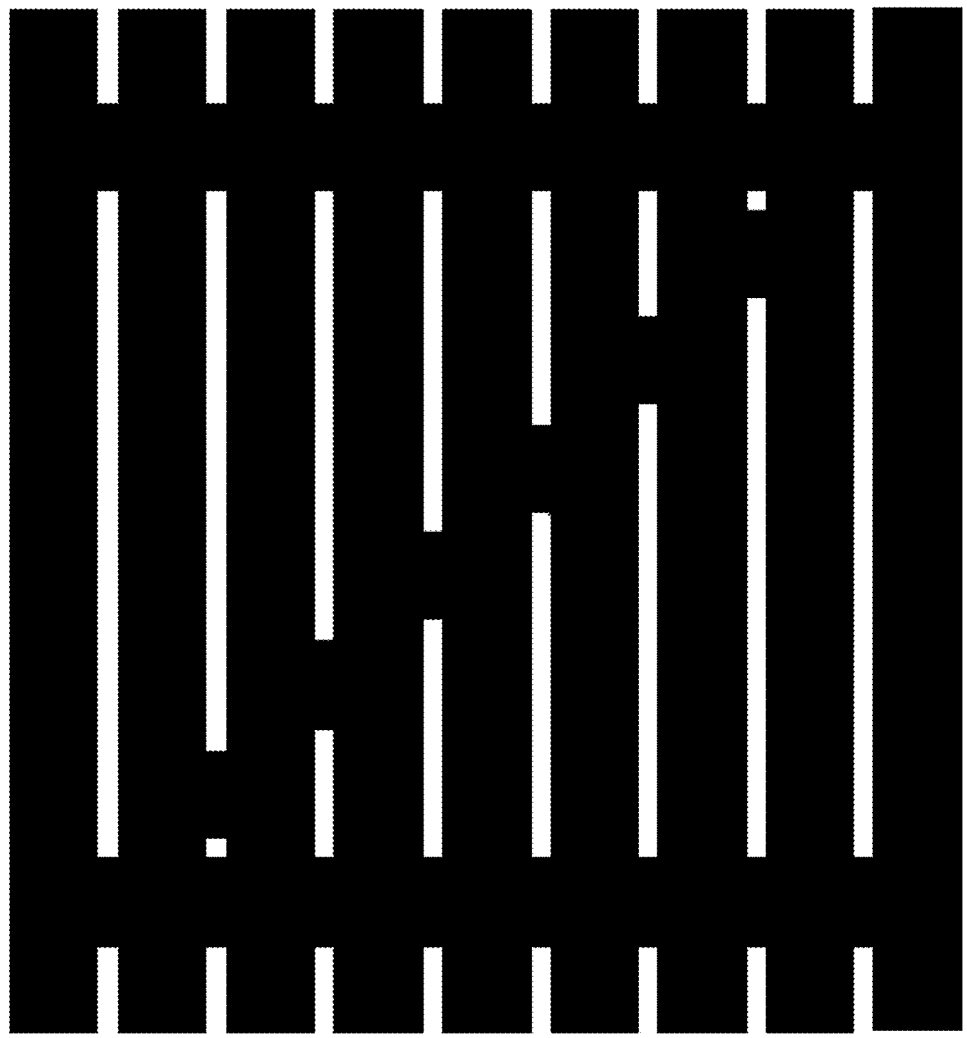
FIG. 11C depicts a second Moiré pattern comprising a capital letter "Z" when viewing the base layer of 11A through the same revealing layer, rotated 90 degrees from the orientation in FIG. 11B.

FIG. 11C depicts the Moiré pattern that is observed when the revealing layer is rotated 90 degrees. A capital letter "Z" is discerned.

What is claimed is:
1. A method comprising:
providing a surface comprising at least one indentation;
providing a revealing layer;
providing a light source;
adjusting at least one of said surface or said light source so that light from said light source impinges on said surface at an illumination angle that is near to a predetermined angle, so as to form at least one shadow in said at least one indentation;
aligning said revealing layer with respect to said surface; and
recovering concealed information by viewing said surface through said revealing layer,
wherein said surface and said revealing layer are configured such that said concealed information is recoverable when said light impinges on said surface at an illumination angle that is near to said predetermined angle, but said information is not recoverable when said light impinges on said surface at an illumination angle that is not near to said predetermined angle.
2. The method of claim 1, wherein said at least one indentation is an indentation that has been formed by embossing or molding.
3. The method of claim 1, wherein said at least one indentation has a triangular cross-section.
4. The method of claim 1, wherein said at least one indentation has a triangular cross section, said at least one indentation comprising one or more walls, said one or more walls making an angle α with said surface,
wherein said illumination angle is β, said illumination angle being less than or equal to said angle α,
wherein said at least one indentation comprises a first width W measured at the surface, and
wherein said at least one indentation comprises a shadow having a second width WD given by:

$$W_D = \left(\frac{\sin\alpha\sin\beta}{\sin(\alpha+\beta)}\right)W.$$

5. The method of claim 1, wherein said at least one indentation has a trapezoidal cross-section.
6. The method of claim 1, wherein said at least one indentation has a trapezoidal cross-section, said at least one indentation comprising one or more walls and a floor, said one or more walls making an angle α with said surface,
wherein said illumination angle is β, said illumination angle being sufficiently small so that no portion of said floor is illuminated by the light source,
wherein said at least one indentation comprises a first width W measured at the surface, and
wherein said at least one indentation comprises a shadow having a second width WD given by:

$$W_D = \left(\frac{\sin\alpha\sin\beta}{\sin(\alpha+\beta)}\right)W.$$

7. The method of claim 1, wherein said at least one indentation has a trapezoidal cross-section, said at least one indentation comprising walls and a floor, said walls making an angle α with said surface,
wherein said illumination angle is β, said illumination angle being sufficiently large that at least some portion said floor is illuminated by the light source, said illumination angle also being less than or equal to said angle α,
wherein said at least one indentation comprises a first width W measured at the surface,
wherein said floor comprises a second width WF, and
wherein said at least one indentation comprises a shadow having a third width WD given by:

$$W_D = \left(\frac{W-W_F}{2}\right)\tan\alpha\cot\beta.$$

8. The method according to claim 4, 6, or 7, wherein said angle α is between 50 and 60 degrees.
9. The method according to claim 4, 6, or 7, wherein said surface comprises a base layer comprising said shadow.
10. The method of claim 1, wherein said concealed information is recoverable only when light from said light source impinges on said surface at an illumination angle that is within about ten degrees of said predetermined angle.
11. The method of claim 1, wherein said concealed information is recoverable only when light from said light source impinges on said surface at an illumination angle that is within about five degrees of said predetermined angle.
12. The method of claim 1, wherein said concealed information is recoverable only when light from said light source impinges on said surface at an illumination angle that is within about two degrees of said predetermined angle.
13. The method of claim 1, wherein said information is concealed on at least one of said surface or said revealing layer.

14. The method of claim 1, wherein said concealed information comprises at least one Moiré pattern.

15. The method of claim 1, wherein said concealed information comprises at least one line Moiré pattern.

16. The method of claim 1, wherein said concealed information comprises at least one shape Moiré pattern.

17. The method of claim 1, wherein said concealed information comprises dots or lines or circles or ellipses or polygons or letters or numbers or barcodes.

18. The method of claim 1, wherein at least one of said surface and said revealing layer comprises at least one confusion pattern.

19. The method of claim 1, wherein said recovering concealed information is performed using a microscope.

20. The method of claim 1, wherein said revealing layer is positioned in an intermediate image plane of a microscope.

21. The method of claim 1, wherein said revealing layer is positioned in an eyepiece of a microscope.

22. The method of claim 1, wherein said revealing layer is touching said surface.

23. The method of claim 1, wherein aligning said revealing layer comprises rotating said revealing layer.

24. The method of claim 1, wherein said light source comprises at least one incandescent bulb, fluorescent bulb, light emitting diode, or laser.

25. The method of claim 1, wherein said surface is part of a pharmaceutical composition.

26. The method of claim 1, wherein said surface is part of a pharmaceutical composition, further comprising validating the authenticity of said pharmaceutical composition using said concealed information.

27. A pharmaceutical composition comprising a surface comprising concealed information that may be recovered by the method of claim 1.

28. A kit comprising a light source and a revealing layer configured for use in the method of claim 1.

29. A microscope comprising a revealing layer configured for use in the method of claim 1.

30. A method comprising:
providing at least one pharmaceutical composition which comprises at least one surface which comprises at least one area which is adapted to provide a Moiré base layer, wherein said at least one surface comprises at least one indentation within said at least one area;
illuminating the area at an angle, so as to form at least one shadow in said at least one indentation; and
imaging the illuminated area with a Moiré revealing layer to generate a Moiré pattern.

31. The method of claim 30, wherein the Moiré revealing layer does not contact the base layer.

32. The method of claim 30, wherein the imaging is carried out with use of a microscope.

33. The method of claim 30, wherein said at least one indentation is an indentation that has been formed by embossing or molding.

34. The method of claim 30, wherein said at least one indentation is a nanoscale indentation.

35. The method of claim 30, wherein said at least one indentation is a microscale indentation.

36. The method of claim 30, wherein the area comprises at least one nanoscale indentation and at least one microscale indentation.

37. The method of claim 30, wherein the area comprises periodic patterns.

38. The method of claim 30, wherein the illuminating step is carried out at a pre-determined angle and a pre-determined direction.

39. The method of claim 30, wherein the revealing layer is positioned at an intermediate image plane in an optical path of a microscope.

40. The method of claim 30, wherein an alignment mark is used to generate the Moiré pattern.

41. The method of claim 30, wherein the Moiré pattern is a line Moiré pattern.

42. The method of claim 30, wherein the Moiré pattern is a shape Moiré pattern.

43. A composition comprising:
a surface; and
at least one indentation formed on the surface,
wherein the surface is configured to reveal a predetermined pattern when a revealing layer is aligned over the surface and light impinges on the surface at an angle near to a predetermined angle,
wherein the surface is configured not to reveal the predetermined pattern when light impinges on the surface at an angle not near to the predetermined angle, whether or not a revealing layer is aligned over the surface, and
wherein the surface is configured not to reveal the predetermined pattern when a revealing layer is not aligned over the surface, whether or not light impinges on the surface at an angle near to the predetermined angle.

44. The composition of claim 43, wherein the surface is configured such that at least a portion of the predetermined pattern is provided by a shadow that forms in the at least one indentation when a revealing layer is aligned over the surface and light impinges on the surface at an angle near to a predetermined angle.

45. The composition of claim 43, wherein the surface is configured such that at least a portion of the first pattern is provided by a shadow that forms in the at least one indentation when the second pattern is aligned over the surface and light impinges on the surface at an angle near to the chosen angle.

46. A method comprising:
providing a surface;
choosing a first pattern, wherein the first pattern is a pattern to be revealed;
choosing a second pattern, wherein the second pattern is a pattern to be located in a revealing layer;
choosing an angle at which light will impinge on the surface to reveal the first pattern; and
forming at least one indentation on the surface,
wherein the at least one indentation is configured such that, when the second pattern is aligned over the surface and light impinges on the surface at an angle near to the chosen angle, the first pattern is revealed to an observer viewing the surface through the revealing layer,
wherein the at least one indentation is configured such that, when the second pattern is not aligned over the surface, the first pattern is not revealed, and
wherein the at least one indentation is configured such that, when light does not impinge on the surface at an angle near to the chosen angle, the first pattern is not revealed.

47. A method comprising:
providing a surface, a revealing layer, and a light source;
adjusting at least one of said surface or said light source so that light from said light source impinges on said surface at an illumination angle that is near to a predetermined angle;
aligning said revealing layer with respect to said surface; and
recovering concealed information by viewing said surface through said revealing layer, wherein said concealed information may be recovered only when light from said light source impinges on said surface at an illumination angle that is near to said predetermined angle, wherein the surface comprises at least one indentation of triangular cross section, said at least one indentation comprising one or more walls, said one or more walls making an angle $\alpha$ with said surface, wherein said illumination angle is $\beta$, said illumination angle being less than or equal to said angle $\alpha$, wherein said at least one indentation comprises a first width W measured at the surface, and wherein said at least one indentation comprises a shadow having a second width $W_D$ given by:

$$W_D = \left(\frac{\sin\alpha \sin\beta}{\sin(\alpha + \beta)}\right) W.$$

* * * * *